United States Patent
Darling et al.

(10) Patent No.: US 9,631,809 B2
(45) Date of Patent: Apr. 25, 2017

(54) BOOSTER AIR HEATER FOR HIGH MOISTURE FUELS

(71) Applicant: General Electric Technology GmbH, Baden (CH)

(72) Inventors: Scott L. Darling, Avon, CT (US); Edward S. Saldon, Simsbury, CT (US)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 0 days.

(21) Appl. No.: 15/284,794

(22) Filed: Oct. 4, 2016

(65) Prior Publication Data
US 2017/0023244 A1 Jan. 26, 2017

Related U.S. Application Data

(62) Division of application No. 13/923,633, filed on Jun. 21, 2013, now Pat. No. 9,482,127.

(51) Int. Cl.
| | | |
|---|---|---|
| *F01N 3/10* | (2006.01) | |
| *F23D 1/00* | (2006.01) | |
| *F23L 15/04* | (2006.01) | |

(52) U.S. Cl.
CPC ............... *F23D 1/005* (2013.01); *F23L 15/04* (2013.01); *F23K 2201/103* (2013.01); *F23K 2201/20* (2013.01); *F23K 2900/01041* (2013.01)

(58) Field of Classification Search
CPC combination set(s) only.
See application file for complete search history.

(56) References Cited

U.S. PATENT DOCUMENTS

2012/0160142 A1* 6/2012 Greenhut ............ B01D 53/8631
110/345

* cited by examiner

*Primary Examiner* — Ellen McAvoy
*Assistant Examiner* — Chantel Graham
(74) *Attorney, Agent, or Firm* — GE Global Patent Operation; Stephen G. Midgley

(57) ABSTRACT

A system for drying pulverized high moisture fuel for use in a selective catalytic reduction system equipped combustion system is provided. The combustion system includes a mill for pulverizing fuel, an air heater, two fuel gas streams at different temperatures, a booster air heater and a fuel duct for feeding dried pulverized fuel to a combustion furnace.

9 Claims, 3 Drawing Sheets

BOOSTER AIR HEATER FOR HIGH MOISTURE FUELS

CROSS-REFERENCE TO RELATED APPLICATIONS

This application is a divisional of U.S. application Ser. No. 13/923,633, filed Jun. 21, 2013, which claims priority to U.S. Provisional Application No. 61/699,484, filed Sep. 11, 2012, both of which are incorporated by reference herein in their entireties

FIELD OF THE INVENTION

The present invention relates generally to a booster air heater for use with high moisture fuels, and more specifically to a booster primary air (PA) heater for use with a selective catalytic reduction (SCR) system equipped combustion system fueled by high moisture fuels such as sub-bituminous coal and lignite.

BACKGROUND OF THE INVENTION

In suspension firing solid fuel, such as coal and lignite, the fuel must be first pulverized before it can be introduced into the furnace in a stream of air commonly termed "primary air" (PA). Such pulverization is accomplished in a mill wherein the solid fuel is simultaneously pulverized and dried in the PA stream. Accordingly, the PA stream entering the mill must be heated to a temperature high enough to ensure sufficient drying of the fuel within the mill. Typically the PA stream is heated in an air preheater prior to entering the mill. As such, the PA stream is heated using heat in a heat exchange relationship from hot flue gas leaving the system boiler. However, in a system requiring a selective catalytic reduction (SCR) system located between the boiler gas exit and the air heater gas inlet, the maximum temperature of flue gas entering the air heater gas inlet is that allowed for efficient operation of the SCR system. Providing flue gas having a maximum temperature of that allowed for efficient operation of the SCR system is insufficient for pulverizing and drying high moisture fuels.

Therefore, it is the general object of the present invention to provide a method and apparatus capable of achieving a sufficiently high PA temperature and quantity to assure adequate drying of high moisture fuels in systems requiring a selective catalytic reduction (SCR) system located between the boiler gas exit and the air heater gas inlet.

It is a specific object of the present invention to provide a method and apparatus for adequately heating the PA flow for high moisture fuel drying and pulverizing while not affecting associated SCR system catalysts.

SUMMARY OF THE INVENTION

The present invention overcomes the above described deficiencies and disadvantages of the prior art in accomplishing the above-identified objectives through a method and apparatus for providing the requisite temperature and quantity of primary air (PA) to a mill for drying and pulverizing high moisture fuel for purposes of furnace combustion.

According to the present invention, PA is first heated from an ambient temperature to a higher temperature in an air heater. The air heater heats the incoming ambient temperature PA through heat exchange. The heat source for the air heater comes from combustion flue gas flowing from a boiler furnace. A selective catalytic reduction (SCR) system is located between the boiler furnace and the air heater. This overall system arrangement provides the gas temperature necessary to ensure the SCR system catalyst is chemically active. However, many SCR catalysts are heat sensitive or adversely affected by higher temperatures, thereby requiring limits to be placed on the maximum temperature of flue gas allowed to flow through the SCR system. By setting a limit on the maximum temperature of flue gas allowed to flow through the SCR system, the temperature of the flue gas entering the air heater from that SCR system is thereby also limited. However, according to embodiments of the present apparatus, a booster air heater is provided. The heat source for this booster air heater is not limited by the SCR system operating temperature, since the heat source of the booster air heater is from flue gas drawn from a system location upstream of the SCR system, such as from a system location upstream of an economizer. The booster air heater is thus capable of efficiently increasing the temperature of the PA prior to its flow into a mill for high moisture fuel pulverization and drying, and use of the fuel in a combustion system furnace.

The present system is a selective catalytic reduction system equipped combustion system fueled by high moisture fuel. The system comprises a mill for pulverizing high moisture fuel to obtain pulverized fuel, an air heater operable to heat primary air to an increased temperature, a booster air heater operable to heat primary air of an increased temperature to a higher temperature, and a fuel duct for passage of higher temperature primary air through the mill to dry the pulverized fuel and to carry the dry pulverized fuel from a mill outlet to a combustion furnace. The high moisture fuel referred to is one or more fuels selected from the group consisting of sub-bituminous coal and lignite. The air heater referred to uses flue gas from a selective catalytic reduction system as a heat source and is also operable to heat secondary air to an increased temperature for use as combustion air in said combustion furnace. The flue gas heat source under full system load has a temperature in the range of 700° F. to about 750° F. upon entering said selective catalytic reduction system. Under partial system load operation, the flue gas heat source has a temperature in the range of 550° F. to about 650° F. upon entering said catalytic reduction system. The heated primary air increased temperature is a temperature in the range of 400° F. to about 500° F. and its higher temperature is a temperature in the range of 700° F. to about 800° F. The temperature of the primary air at the mill outlet is in the range of 160° F. to about 220° F.

The present method is for drying pulverized high moisture fuel used to fuel a selective catalytic reduction system equipped combustion system. The method comprises pulverizing in a mill a high moisture fuel to produce a moist pulverized fuel, heating primary air in an air heater to an increased temperature, heating primary air of an increased temperature in a booster air heater to a higher temperature, drying the moist pulverized fuel using higher temperature primary air heater to produce a dry pulverized fuel, and feeding the dry pulverized fuel to a combustion furnace useful for power generation. The high moisture fuel is one or more fuels selected from the group consisting of sub-bituminous coal and lignite. The noted air heater uses flue gas from a selective catalytic reduction system as a heat source and is also operable to heat secondary air to an increased temperature for use as combustion air in said combustion furnace. Under full load, the flue gas has a temperature in the range of 700° F. to about 750° F. upon entering the selective catalytic reduction system. Under partial load, the flue gas has a temperature in the range of 550° F. to about 650° F. upon entering the catalytic reduction system. The increased temperature of the primary air is a temperature in the range of 400° F. to about 500° F. and the higher temperature of the primary air is a temperature in the range of 700° F. to about 800° F.18. The primary air temperature at said mill outlet is in the range of 160° F. to about 220° F.

Further objects and features of the present invention will be apparent from the description and the claims.

BRIEF DESCRIPTION OF THE DRAWINGS

The present invention will now be described in more detail with reference to the appended drawings.

DETAILED DESCRIPTION

Figure 1:
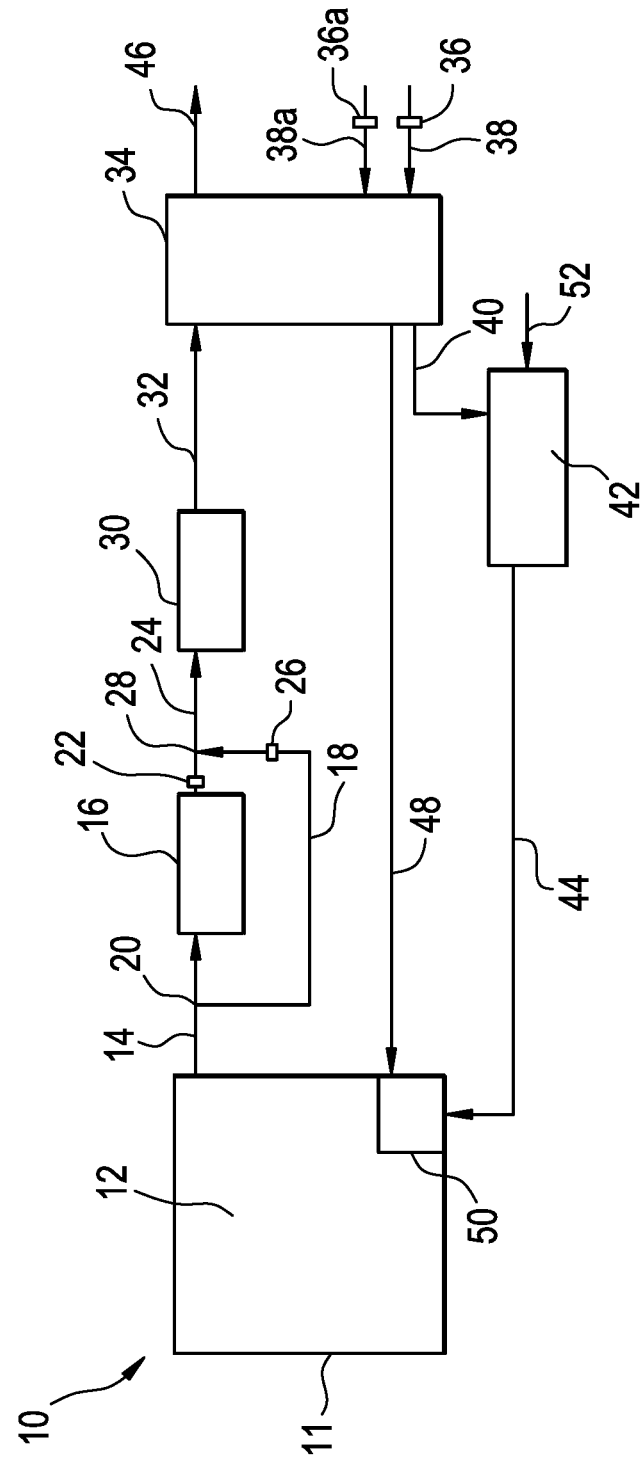
FIG. 1 is a schematic side view illustrating a pulverized fuel-fired boiler operated in accordance with the prior art.

Referring now to the prior art of FIG. 1, there is illustrated a pulverized fuel-fired steam generator combustion system 10 having a furnace 11 defining an interior chamber 12 therein wherein pulverized fuel (PF) is burned thereby generating hot flue gas (FG). FG generated in interior chamber 12 flows therefrom through a fluidly connected exit duct 14. Exit duct 14 includes in fluid communication therewith an economizer 16 and a by-pass duct 18 that separates at fluid connection 20 to circumvent and by-pass economizer 16. As such, all or a portion of FG flowing from interior chamber 12 flows through economizer 16 and none or a portion of FG flowing from interior chamber 12 may be allowed to flow through by-pass duct 18.

In order to control the flow of FG through economizer 16 is a control valve 22 downstream with regard to the flow of FG from economizer 16 into economizer exit duct 24. Likewise, to control the flow of FG through by-pass duct 18 is a control valve 26 upstream with regard to the flow of FG to fluid connection 28 of by-pass duct 18 with economizer exit duct 24. Control valves 22 and 26 work in cooperation to control the flow and thereby the temperature of FG. For example, if cooler FG is desired, all FG may be made to flow through economizer 16 by fully opening control valve 22 and fully closing control valve 26. Likewise, if warmer FG is desired, control valve 22 may be partially closed and control valve 26 is at least partially opened to allow a portion of FG to by-pass economizer 16. The system 10 is designed such that no by-pass of FG through by-pass duct 18 is needed when system 10 is operated at full load. With system 10 operating at partial loads, such as at times of low system 10 demand, the temperature of FG flowing from economizer 16 may fall below that needed by the SCR catalyst (not shown) for proper performance. In such cases, valve 26 of by-pass duct 18 is opened to allow or increase FG flow through by-pass duct 18 and thereby increase the temperature of FG flowing into the SCR system 30 to ensure proper SCR catalyst performance.

Economizer 16 is used to cool FG to a lower temperature, typically a temperature lower than 700° F. to 750° F. so as to be within a temperature range suitable for proper SCR system 30 operation. FG flows from economizer 16 through fluidly connected economizer exit duct 24 to fluidly connected SCR system 30.

SCR system 30 operates as a typical SCR system to remove nitrous oxides (NOx) and like pollutants from the FG. Fluidly connected to SCR system 30 is duct 32. Duct 32 is fluidly connected to an air heater 34 used to heat both primary air (PA) and secondary air (SA). PA is ambient temperature air from the environment that is heated and used in a mill for drying and pulverizing fuel. SA is ambient temperature air from the environment that is heated and used as combustion air in furnace 11.

As illustrated in FIG. 1, FG flows from SCR system 30 to air heater 34 via duct 32. FG is used as a source of heat for air heater 34. As such, FG of a temperature flows into air heater 34 via duct 32, and at a lower temperature than that of flowing in, flows out of air heater 34 via fluidly connected duct 46.

PA of an ambient temperature is pulled into combustion system 10 by a fluidly connected fan 36 within fluidly connected intake duct 38 of air heater 34. SA of an ambient temperature is drawn into combustion system 10 by a separate fluidly connected fan 36a within a separate fluidly connected intake duct 38a of air heater 34. Accordingly, ambient PA and ambient SA are heated in air heater 34 by heat exchange, wherein FG serves as the source of heat as described above. From air heater 34, PA flows through fluidly connected duct 40 to mill 42 and SA flows through fluidly connected duct 48 to furnace 11.

Mill 42 is where fuel is pulverized for combustion in furnace 11. When high moisture fuel such as sub-bituminous coal and lignite is pulverized, moisture is released. For proper entrainment and flow of pulverized fuel though duct 44 fluidly connected between mill 42 and furnace 11, moisture released upon high moisture fuel pulverization must be dried. The heated PA flowing through duct 40 to mill 42 is thus used for such purpose as described in more detail below.

Furnace 11 is fired by injecting pulverized fuel into the furnace 11 through burners 50. The amount of fuel injected into the furnace 11 is controlled in response to combustion system 10 load demand, such as for example, the demand on a steam generator (not shown) to provide a total heat release necessary to yield a desired stream generation for a given steam generator design (not shown).

In pulverized fuel firing, as illustrated in FIG. 1, solid fuel such as coal and/or lignite is fed from a storage bin (not shown) at a controlled rate, depending on combustion system 10 demand therefor, through feeder 52 to the mill 42 where the fuel is pulverized to a fine powder-like particle size. In a typical pulverized fuel-fired furnace 11, PA is supplied to the mill 42 for transporting the pulverized fuel from the mill 42 to the burners 50 to be injected into the furnace 11 and burned as a suspension therein. As mentioned previously, the PA supplied to the mill 42 is first preheated in the air heater 34 wherein the PA is passed in heat exchange relationship with the FG leaving the furnace through exit ducts 14, 18, 24 and 32. As the PA sweeps through the mill 42, the comminuted coal is entrained therein and dried by the heat content of the PA. However, because the PA heated by the FG flowing through air heater 34 has a maximum obtainable temperature limited by the temperature of the FG following from SCR system 30, PA is often times ineffective in adequately drying the pulverized fuel as the required mill outlet temperature of 160° F. to 220° F. cannot be achieved.

Figure 2:
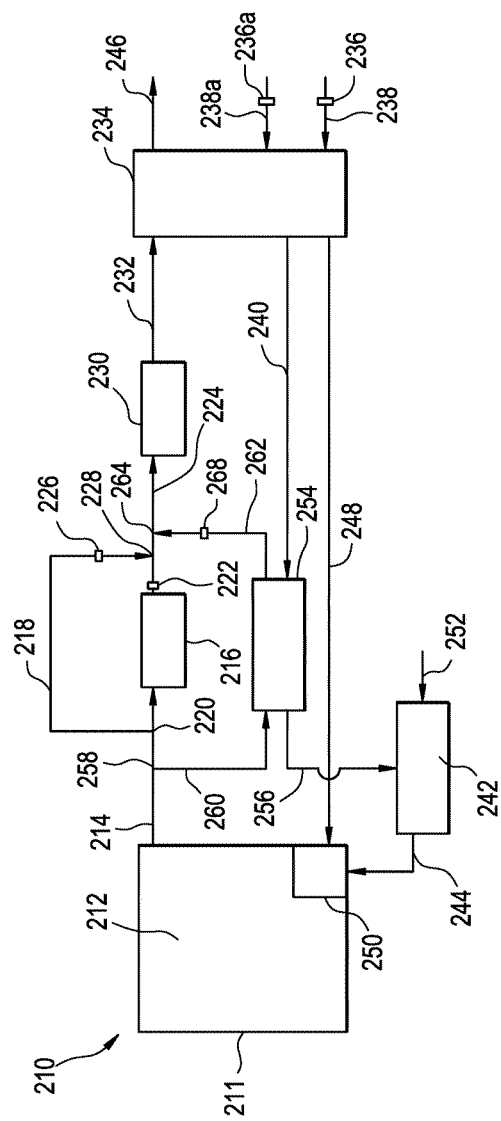
FIG. 2 is a schematic side view illustrating a pulverized fuel-fired boiler operated in accordance with one embodiment of the present invention.

To address the problem associated with inadequate drying of high moisture fuels in combustion systems 10 equipped with SCR systems 30 as described above and illustrated in FIG. 1, the present apparatus embodiment is disclosed herein and illustrated in FIG. 2. The present apparatus schematically illustrated in FIG. 2 has features in common with those illustrated in FIG. 1. As such, features illustrated in FIG. 2 common to those of FIG. 1 are signified using the same numbers but with the number "2" preceding them.

Referring now to FIG. 2, there is illustrated a pulverized high moisture fuel-fired steam generator combustion system 210 having a furnace 211 defining an interior chamber 212 therein wherein pulverized fuel (PF) is burned thereby generating hot flue gases (FG). FG generated in interior chamber 212 flows therefrom through a fluidly connected exit duct 214. Exit duct 214 includes in fluid communication therewith an economizer 216 and a by-pass duct 218 that separates from exit duct 214 at fluid connection 220 to circumvent and by-pass economizer 216. As such, all or a portion of FG flowing from interior chamber 212 flows through economizer 216 and none or a portion of FG flowing from interior chamber 212 may flow through by-pass duct 218. Exit duct 214 also includes in fluid communication therewith a booster air heater 254 and a by-pass duct 260 that separates from exit duct 214 at fluid connection 258 to circumvent and by-pass economizer 216. FG flowing through booster air heater 254 through heat transfer is cooled prior to flowing outwardly through fluidly connected exit duct 262, which rejoins economizer exit duct 224 downstream of fluid connection 228. As such, all or a portion of FG flowing from interior chamber 212 flows through economizer 216 and none or a portion of FG flowing from interior chamber 212 may flow through by-pass duct 218 and/or by-pass duct 260. At full load, combustion system 210 preferably operates with up to about 50 percent of FG flowing through by-pass duct 260 and almost no FG flowing through by-pass duct 218.

In order to control the flow of FG through economizer 216 is a control valve 222 downstream with regard to the flow of FG from economizer 216 into economizer exit duct 224. Likewise, to control the flow of FG through by-pass duct 218 is a control valve 226 upstream with regard to the flow of FG to fluid connection 228 of by-pass duct 218 with economizer exit duct 224. To control the flow of FG through exit duct 262 is a control valve 268 upstream with regard to the flow of FG to fluid connection 264. Control valves 222, 226 and 268 work in cooperation to control the flow of FG. For example, if cooler FG is desired, all FG may be made to flow through economizer 216 and booster air heater 254 by fully opening control valves 222 and 268, while fully closing control valve 226. Likewise, if warmer FG is desired, control valve 222 and/or 268 are partially closed and control valve 226 is at least partially opened to allow a portion of FG to by-pass economizer 216 and/or booster air heater 254. If hot FG is desired, control valves 222 and 268 could be fully closed and control valve 226 fully opened to by-pass economizer 216 and booster air heater 254. However, in the case of the current embodiment wherein an SCR system 230 is used for FG treatment, such hot FG must be avoided to protect SCR operation. SCR operation is dependent upon properly functioning catalysts, which are heat sensitive. Allowing hot FG to flow through an SCR system 230 can destroy expensive catalysts.

Economizer 216 and booster air heater 254 are used to cool FG to a lower temperature, preferably a temperature lower than 700° C. to 750° C. so as to be within a temperature range suitable for proper SCR system 230 operation. FG flows from economizer 216 and booster air heater 254, through fluidly connected economizer exit duct 224 and fluidly connected exit duct 262, respectively, to fluidly connected SCR system 230.

SCR system 230 operates as a typical SCR to remove nitrous oxides (NOx) and like pollutants from the FG. Fluidly connected to SCR system 230 is duct 232. Duct 232 is fluidly connected to a primary air (PA) air heater 234. As such, FG flows from SCR system 230 to air heater 234 via duct 232. Duct 232 is fluidly connected to an air heater 234 used to heat both primary air (PA) and secondary air (SA). PA is ambient temperature air from the environment that is heated and used in a mill for drying and pulverizing fuel. SA is ambient temperature air from the environment that is heated and used as combustion air in furnace 211.

As illustrated in FIG. 2, FG flows from SCR system 230 to air heater 234 via duct 232. FG is used as a source of heat for air heater 234. As such, FG of a temperature flows into air heater 234 via duct 232, and at a lower temperature than that of flowing in, flows out of air heater 234 via fluidly connected duct 246.

PA of an ambient temperature is pulled into combustion system 210 by a fluidly connected fan 236 within fluidly connected intake duct 238 of air heater 234. SA of an ambient temperature is drawn into combustion system 210 by a separate fluidly connected fan 236a within a separate fluidly connected intake duct 238a of air heater 234. As an alternative, SA could also be drawn into combustion system 210 by fan 236 in intake duct 238. Accordingly, ambient PA and ambient SA are heated in air heater 234 by heat exchange, wherein FG serves as the source of heat as described above. From air heater 234, PA flows through fluidly connected duct 240 to enter fluidly connected booster air heater 254. Although PA has been heated in air heater 234, the PA is of a lower temperature than that of the FG flowing through booster air heater 254 from duct 260. As such, through heat transfer from hot FG, PA is heated further by booster air heater 254 prior to flow through fluidly connected duct 256 to mill 242. SA flows through fluidly connected duct 248 to furnace 211.

Mill 242 is where fuel is pulverized for combustion in furnace 211. When high moisture fuel, such as sub-bituminous coal and/or lignite is pulverized, moisture is released. For entrainment and flow of pulverized fuel though duct 244 fluidly connected between mill 242 and furnace 211, moisture released upon high moisture fuel pulverization must be dried. The heated PA flowing through duct 240 to booster air heater 254 and then mill 242, is effectively used for such purpose as described in more detail below.

The furnace 211 is fired by injecting pulverized fuel into the furnace thru burners 250. In accordance with conventional practice, the amount of fuel injected into the furnace 211 is controlled in response to load demand on the steam generator to provide the total heat release necessary to yield a desired stream generation for the given steam generator design.

In pulverized fuel firing, as illustrated in FIG. 2, solid fuel, such as coal and/or lignite, is fed from a storage bin (not shown) at a controlled rate, depending on the demand therefor by combustion system 210, through feeder 252 to the mill 242 where the fuel is pulverized to a fine powder-like particle size. In pulverized fuel-fired furnace 211, PA is supplied to the mill 242 for transporting the pulverized fuel from the mill 242 to the burners 250 to be injected into the furnace 211 and burned as a suspension therein. As mentioned previously, the PA supplied to the mill 242 is first preheated in the air heater 234 wherein the PA is passed in heat exchange relationship with the FG leaving the furnace 211 through exit ducts 214, 218, 260, 262, 224 and 232, and then heated a second time in booster air heater 254 wherein the PA is passed in heat exchange relationship with the FG leaving the furnace through exit ducts 260 and 262. As the PA sweeps through the mill 242, the comminuted pulverized fuel is entrained therein and dried by the heat content of the PA heated by heat transfer from the FG flowing through air heater 234 and booster air heater 254. A mill 242 outlet temperature in the range of about 160° F. to about 220° F. is needed to ensure adequate fuel drying. Thus, the maximum obtainable temperature of the PA is no longer limited by the temperature of the FG flowing from SCR system 230. For this reason, PA is economically heated to a higher temperature than otherwise possible and is thereby effective in drying pulverized high moisture fuel even with SCR system 230 treatment of FG.

Figure 3:
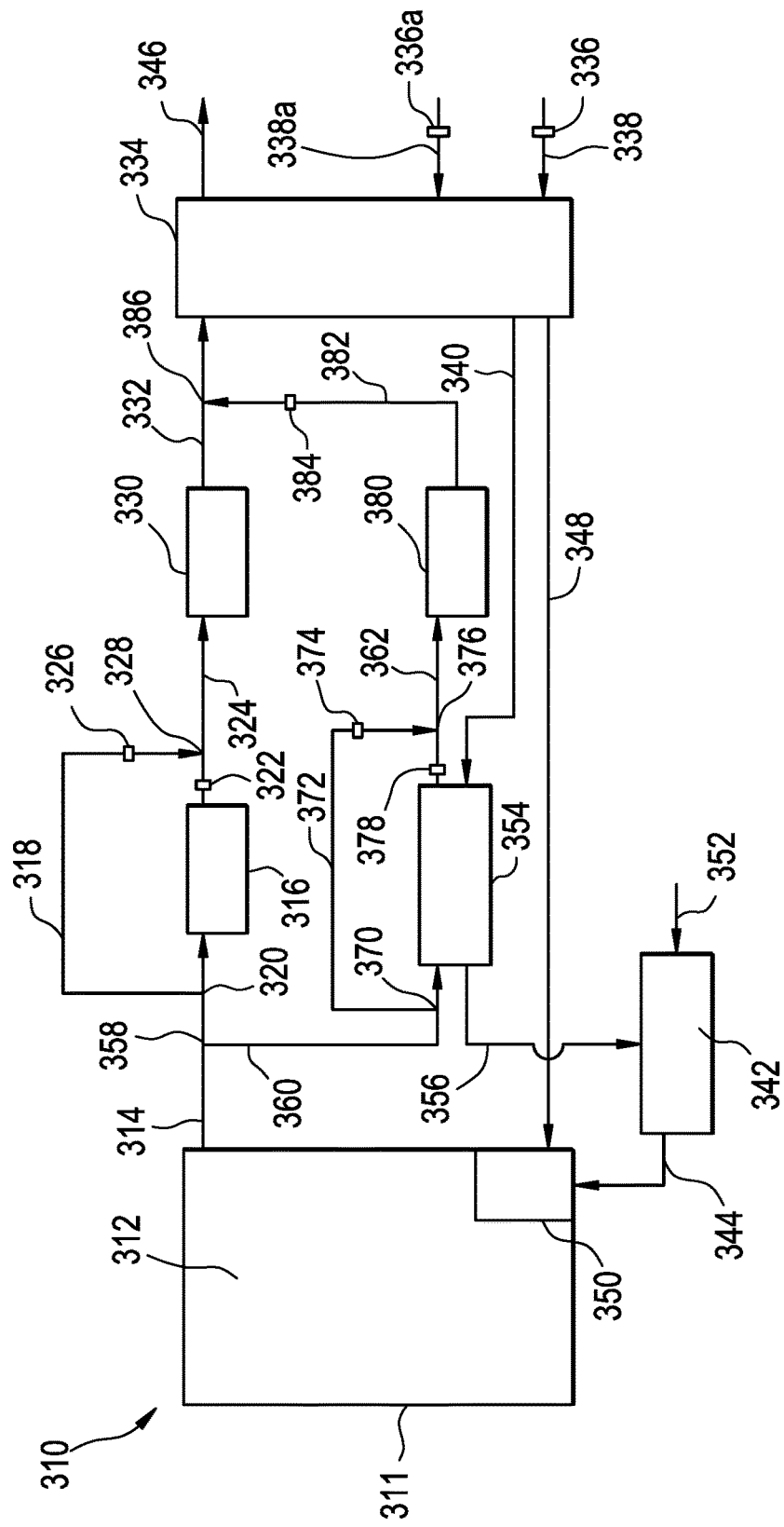
FIG. 3 is a schematic side view illustrating a pulverized fuel-fired boiler operated in accordance with another embodiment of the present invention.

Now referring to the apparatus of another embodiment illustrated in FIG. 3. The apparatus schematically illustrated in FIG. 3 has features in common with those illustrated in FIG. 1. As such, features illustrated in FIG. 3 common to those of FIG. 1 are signified using the same numbers but with the number "3" preceding them.

Referring now to FIG. 3, there is illustrated a pulverized fuel-fired steam generator combustion system 310 having a furnace 311 defining an interior chamber 312 therein wherein pulverized fuel (PF) is burned thereby generating hot flue gas (FG). FG generated in interior chamber 312 flows therefrom through a fluidly connected exit duct 314. Exit duct 314 includes in fluid communication therewith an economizer 316 and a by-pass duct 318 that separates from exit duct 314 at fluid connection 320 to circumvent and by-pass economizer 316. As such, all or a portion of FG flowing from interior chamber 312 flows through economizer 316 and none or a portion of FG flowing from interior chamber 312 may flow through by-pass duct 318. Exit duct 314 also includes in fluid communication therewith a booster air heater 354 and a by-pass duct 360 that separates from exit duct 314 at fluid connection 358 upstream of fluid connection 320 to circumvent and by-pass economizer 316. Fluid connection 358 is arranged in exit duct 314 upstream with regard to the flow of FG of fluid connection 320 since a larger portion and a larger flow of FG is typically desired through by-pass duct 360 than that of by-pass duct 318. FG flowing through by-pass duct 360 to booster air heater 354 is cooled through heat transfer prior to flowing outwardly from booster air heater 354 through fluidly connected exit duct 362. Exit duct 362 is fluidly connected to a second SCR system 380. As such, a portion of FG flowing from interior chamber 312 flows through economizer 316, and none or a portion of FG flowing from interior chamber 312 may flow through by-pass duct 318, and a significant portion of FG flowing from interior chamber 312 flows through by-pass duct 360. At full load, combustion system 310 preferably operates with up to about 50 percent of FG flowing through by-pass duct 360 and almost no FG flowing through by-pass duct 318.

In order to control the flow of FG through economizer 316 is a control valve 322 downstream with regard to the flow of FG from economizer 316 into economizer exit duct 324. Likewise, to control the flow of FG through by-pass duct 318 is a control valve 326 upstream with regard to the flow of FG to fluid connection 328 of by-pass duct 318 with economizer exit duct 324. To control the flow of FG from booster air heater 354 through exit duct 362 is a control valve 378 upstream with regard to the flow of FG to second SCR system 380.

By-pass duct 360 includes a by-pass duct 372 fluidly connected thereto at fluid connection 370. By-pass duct 372 by-passes booster air heater 354 for fluid connection to exit duct 362 at fluid connection 376. Upstream of fluid connection 376 in by-pass duct 372 is a control valve 374. Likewise, upstream of fluid connection 376 in exit duct 362 is control valve 378.

Control valves 322, 326, 374 and 378 work in cooperation to control the flow of FG. For example, if cooler FG is desired, all FG may be made to flow through economizer 316 and booster air heater 354 by fully opening control valves 322 and 378, while fully closing control valves 326 and 374. Likewise, if warmer FG is desired, control valve 322 and/or 378 are partially closed and control valves 326 and 374 are partially opened to allow a portion of FG to by-pass economizer 316 and/or booster air heater 354. If hot FG is desired, control valves 322 and 378 could be fully closed and control valves 326 and 374 fully opened to by-pass economizer 316 and booster air heater 354. However, in the case of the current embodiment wherein SCR systems 330 and 380 are used for FG treatment, such hot FG must be avoided to protect SCR operation. SCR operation is dependent upon properly functioning catalysts, which are heat sensitive. Allowing hot FG to flow through an SCR systems 330 and 380 can destroy expensive catalysts.

Economizer 316 and booster air heater 354 are used to cool FG to a lower temperature, typically a temperature lower than 700° C. to 750° C. so as to be within a temperature range suitable for proper SCR system 330 and 380 operation. FG flows from economizer 316 and booster air heater 354, through fluidly connected economizer exit duct 324 and fluidly connected exit duct 362, respectively, to fluidly connected SCR systems 330 and 380, respectively.

SCR systems 330 and 380 operate as typical SCRs to remove nitrous oxides (NOx) and like pollutants from the FG. Having two SCR systems 330 and 380 in parallel is of particular benefit to enable more efficient combustion system 310 operation. Fluidly connected to SCR system 330 is duct 332. Duct 332 is fluidly connected to a primary air (PA) air heater 334. As such, FG flows from SCR system 330 to air heater 334 via duct 332. FG is used as a source of heat for air heater 334. FG flows into air heater 334 via duct 332 and out of air heater 334 via fluidly connected duct 346.

Similarly, fluidly connected to SCR system 380 is duct 382. Within duct 382 prior to fluidly connecting to duct 332 at fluid connection 386 is control valve 384. Control valve 384 is useful to control the volume of FG flowing through SCR system 380 and into duct 332.

PA is ambient air from the environment pulled into the combustion system 310 by a fluidly connected fan 336 within fluidly connected intake duct 338 of air heater 334. Ambient PA is heated by the FG prior to flow through fluidly connected duct 340. Heated PA flowing through duct 340 enters fluidly connected booster air heater 354. Although PA has been heated in air heater 334, the PA is of a lower temperature than that of the FG flowing through booster air heater 354 from duct 360. As such, through heat transfer from hot FG, PA is heated further by booster air heater 354 prior to flow through fluidly connected duct 356 to mill 342.

SA of an ambient temperature is drawn into combustion system 310 by a separate fluidly connected fan 336a within a separate fluidly connected intake duct 338a of air heater 334. As an alternative, SA could also be drawn into combustion system 310 by fan 336 in intake duct 338. Accordingly, ambient PA and ambient SA are heated in air heater 334 by heat exchange, wherein FG serves as the source of heat as described above. From air heater 334, SA flows through fluidly connected duct 348 to furnace 311.

Mill 342 is where fuel is pulverized for combustion in furnace 311. When high moisture fuel such as sub-bituminous coal and/or lignite is pulverized, moisture is released. For entrainment and flow of pulverized fuel though duct 344 fluidly connected between mill 342 and furnace 311, moisture released upon high moisture fuel pulverization must be dried. The heated PA flowing through duct 340 to booster air heater 354 and then mill 342, is effectively used for such purpose as described in more detail below.

Furnace 311 is fired by injecting pulverized fuel into the furnace through burners 350. The amount of fuel injected into the furnace 311 is controlled in response to load demand on the steam generator to provide the total heat release necessary to yield a desired stream generation for the given steam generator design.

In pulverized fuel firing, as illustrated in FIG. 3, solid fuel such as coal and/or lignite is fed from a storage bin (not shown) at a controlled rate, depending upon the demand therefor by combustion system 310, through feeder 352 to the mill 342 where the fuel is pulverized to a fine powder-like particle size. In fuel-fired furnace 311, PA is supplied to the mill 342 for transporting the pulverized fuel from the mill 342 to the burners 350 to be injected into the furnace 311 and burned as a suspension therein. As mentioned previously, the PA supplied to the mill 342 is first preheated in the air heater 334 wherein the PA is passed in heat exchange relationship with the FG leaving the furnace through exit ducts 314, 318, 360, 362, 324, 372, 382 and 332, and then heated a second time in booster air heater 354 wherein the PA is passed in heat exchange relationship with the FG leaving the furnace through exit ducts 360 and 362. As the PA sweeps through the mill 342, the comminuted fuel is entrained therein and dried by the heat content of the PA heated by heat transfer from the FG flowing through air heater 334 and booster air heater 354. A mill 342 outlet temperature in the range of approximately 160° F. to about 220° F. is needed to ensure the fuel is adequately dried for use. Thus, the maximum obtainable temperature of the PA is no longer limited by the temperature of the FG following from SCR system 330. For this reason, PA is economically heated to a higher temperature than otherwise possible and is thereby effective in drying pulverized high moisture fuel even with SCR systems 330 and 380 treatment of FG.

In a method of using the apparatus illustrated in FIG. 2, FG is cooled in economizer 216 to a temperature in the range of about 700° F. to about 750° F. and booster air heater 254 to a temperature in the range of about 700° F. to about 750° F. prior to contact and treatment in SCR system 230, which operates at a temperature in the range of about 700° F. to about 750° F. at full load. With operation at part loads, SCR system 230 must be maintained at a temperature in the range of about 550° F. to about 650° F. to ensure adequate catalyst performance. After contact and treatment in SCR system 230, FG is further cooled in air heater 234 to a temperature in the range of about 250° F. to about 300° F. prior to exit through duct 246. PA is heated through heat exchange in air heater 234 to a temperature in the range of about 400° F. to about 500° F. and booster air heater 254 to a temperature in the range of about 700° F. to about 800° F. prior to passage through mill 242 to dry high moisture fuel pulverized therein, to obtain dried pulverized fuel. Mill 242 outlet temperature must be maintained at a temperature in the range of about 160° F. to about 220° F.

In a method of using the apparatus illustrated in FIG. 3, FG is cooled in economizer 316 to a temperature in the range of about 700° F. to about 750° F. and booster air heater 354 to a temperature in the range of about 700° F. to about 750° F. prior to contact and treatment in SCR systems 330 and 380, which operate at a temperature in the range of about 700° F. to about 750° F. After contact and treatment in SCR systems 230 and 380, FG is further cooled in air heater 334 to a temperature in the range of about 250° F. to about 300° F. prior to exit through duct 346. PA is heated through heat exchange in air heater 334 to a temperature in the range of about 400° F. to about 500° F. and booster air heater 354 to a temperature in the range of about 700° F. to about 800° F. prior to passage through mill 342 to dry high moisture fuel pulverized therein, to obtain dried pulverized fuel. Mill 342 outlet temperature must be maintained at a temperature in the range of about 160° F. to about 220° F.

While the preferred embodiment has been shown and described in relation to a pulverized fuel-fired steam generator, the present invention may apply to any of a number of combustion systems wherein pulverized fuel is burned and various modifications may be made thereto by those skilled in the art without departing from the spirit and scope of the invention. Accordingly, it is to be understood that the invention has been described by way of illustration and is to be limited only in accordance with the claims appended hereto

What is claimed is:

1. A selective catalytic reduction system equipped combustion system fueled by high moisture fuel comprising:
   a mill for pulverizing high moisture fuel to obtain pulverized fuel;
   an interior chamber;
   an air heater operable to heat primary air to an increased temperature using a first flue gas stream and a second flue gas stream, the second flue gas stream being a portion of the flue gas exiting the interior chamber of the combustion system prior to passing through a heat exchanger and being a higher temperature than the first flue gas stream;
   a booster air heater operable to heat primary air of an increased temperature to a higher temperature using the second flue gas stream; and
   a fuel duct for passage of higher temperature primary air through the mill to dry the pulverized fuel and to carry the dry pulverized fuel from a mill outlet to a combustion furnace.

2. The system according to claim 1 wherein said high moisture fuel is one or more fuels selected from the group consisting of sub-bituminous coal and lignite.

3. The system according to claim 1 wherein said air heater uses flue gas from a selective catalytic reduction system as a heat source.

4. The system according to claim 3 wherein said flue gas has a temperature in the range of 700° F. to about 750° F. upon entering said selective catalytic reduction system.

5. The system according to claim 3 wherein said flue gas has a temperature in the range of 550° F. to about 650° F. upon entering said catalytic reduction system.

6. The system according to claim 1 wherein said increased temperature is a temperature in the range of 400° F. to about 500° F.

7. The system according to claim 1 wherein said higher temperature is a temperature in the range of 700° F. to about 800° F.

8. The system according to claim 1 wherein said air heater is also operable to heat secondary air to an increased temperature for use as combustion air in said combustion furnace.

9. The system according to claim 1 wherein said primary air temperature at said mill outlet is in the range of 160° F. to about 220° F.

\* \* \* \* \*